Nov. 13, 1934.  H. C. SNOW ET AL  1,980,505
AUTOMOTIVE TRANSMISSION
Filed April 14, 1933   3 Sheets-Sheet 1
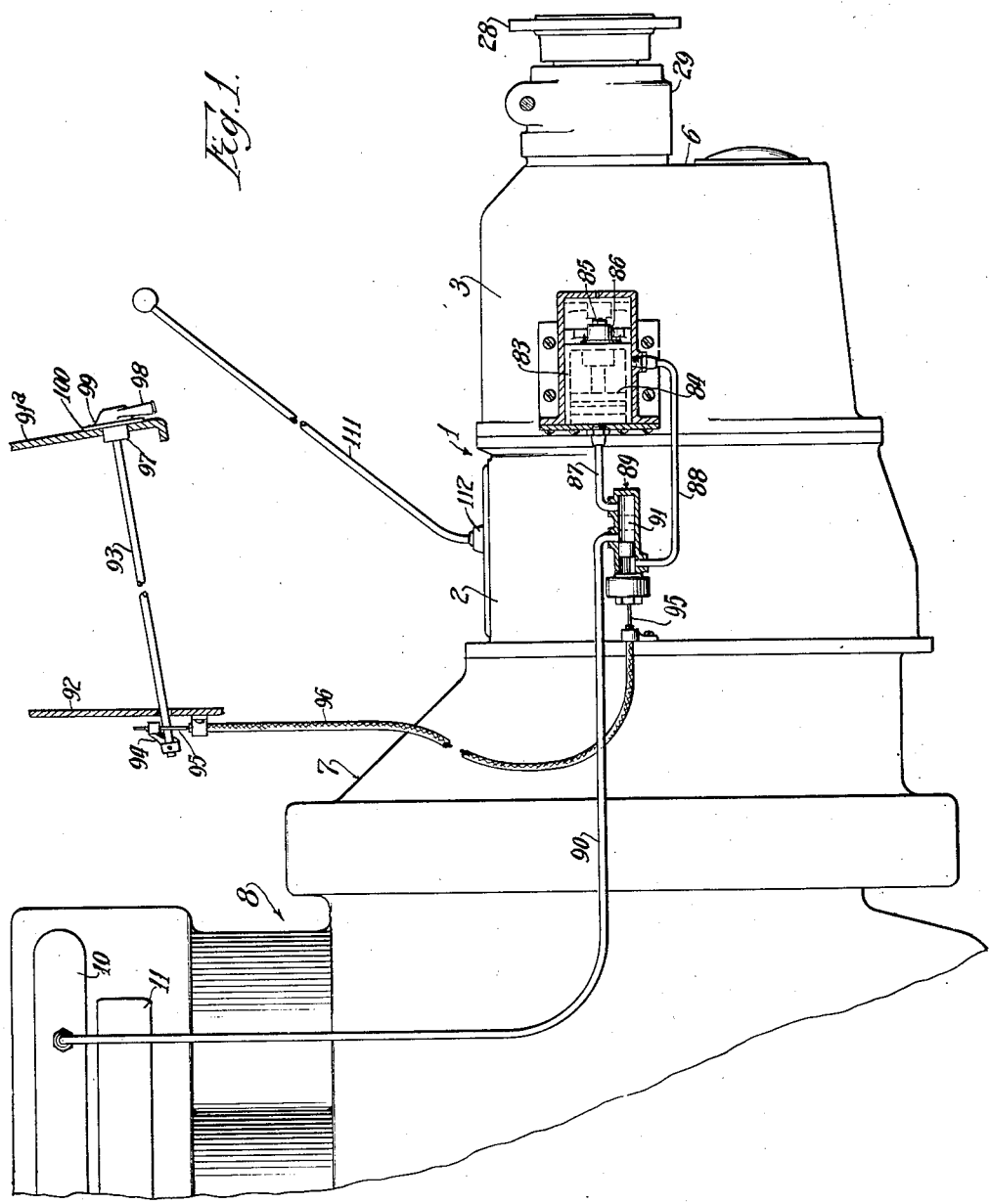
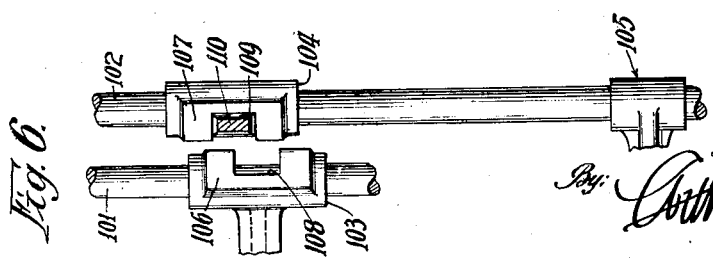
Inventors:
Herbert C. Snow,
Arthur J. Stone,
By Arthur W. Nelson Atty.

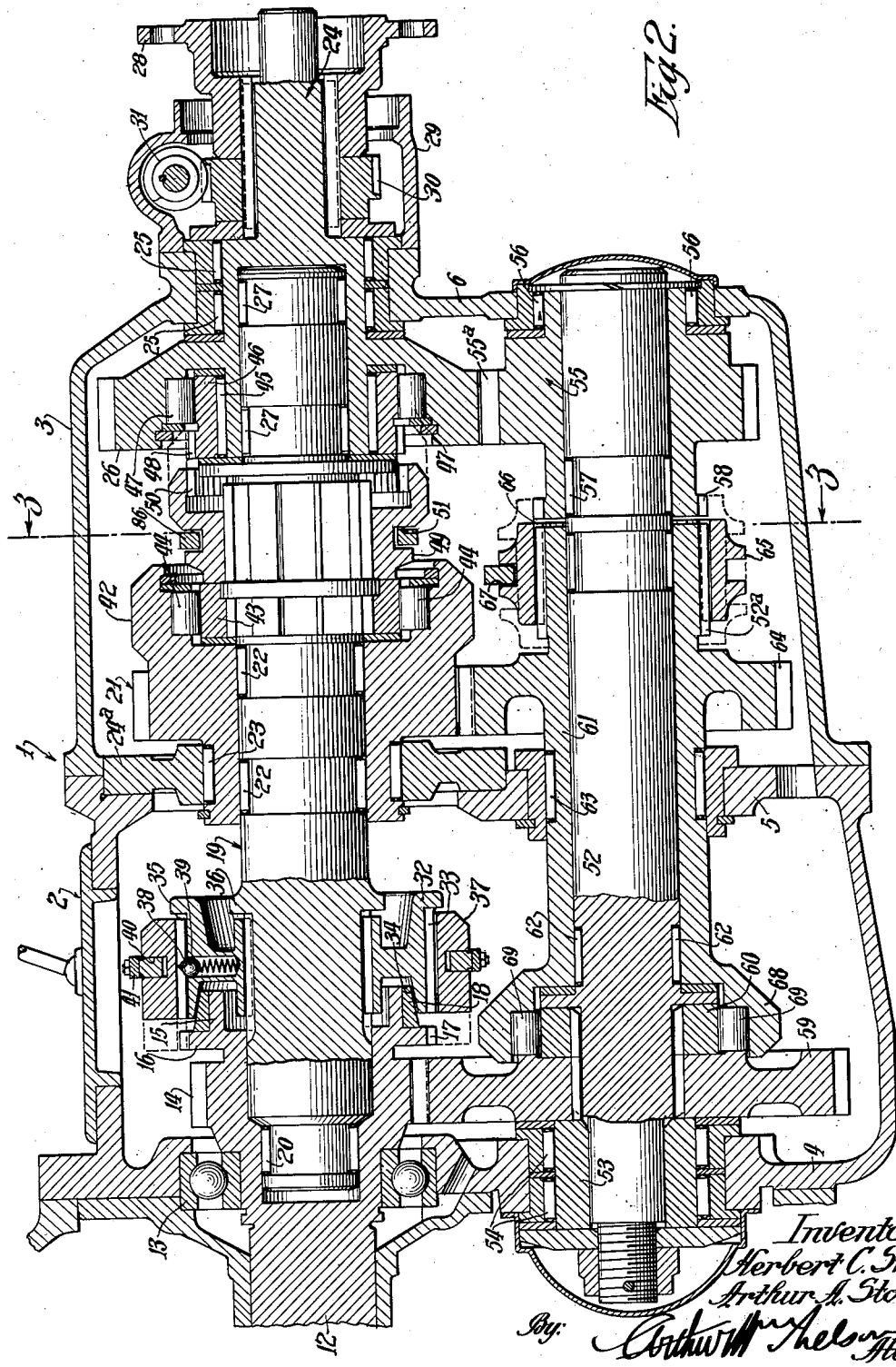

Nov. 13, 1934.  H. C. SNOW ET AL  1,980,505
AUTOMOTIVE TRANSMISSION
Filed April 14, 1933   3 Sheets-Sheet 3

Inventors:
Herbert C. Snow,
Arthur A. Stone,

Patented Nov. 13, 1934

1,980,505

UNITED STATES PATENT OFFICE 1,980,505

AUTOMOTIVE TRANSMISSION

Herbert C. Snow and Arthur A. Stone, Auburn, Ind., assignors to Manning & Co., Chicago, Ill., a corporation of Illinois Application April 14, 1933, Serial No. 666,116

26 Claims. (Cl. 74—359)

This invention relates to improvements in automotive transmissions and it consists of the matters hereinafter described and more particularly pointed out in the appended claims.

One of the objects of the present invention is to provide a transmission of this kind capable of yielding a plurality of speed ratios forward and one reverse, selective by suitable means and which transmission shall be capable of yielding a higher speed ratio forward selective by another means.

Another object of the invention is to provide a transmission of this kind capable of yielding a plurality of speed ratios forward and one reverse selective by means of a conventional shift lever and which transmission is capable of yielding a higher speed ratio forward selective by means independent of said shift lever.

A further object of the invention is to provide a transmission of this kind wherein free wheeling is possible in certain of the forward speed ratios and wherein said free wheeling is automatically locked out when going into reverse and is automatically reestablished in going out of reverse.

Still another object of the invention is to provide a transmission of this kind which is compact in the arrangement of its parts; which is simple and substantial in construction; and which is durable so that it will give long periods of use without requiring service attention.

The above mentioned objects of the invention, as well as others, together with the many advantages thereof, will more fully appear as we proceed with our specification.

In the drawings:

Fig. 1 is a view in side elevation of an automotive transmission embodying our invention and shows its position with respect to an associated engine and clutch and further shows certain parts wherewith desired speed selections may be made;

Fig. 2 is a longitudinal vertical sectional view through our improved transmission on an enlarged scale;

Fig. 6 is a detail horizontal sectional view through a part of the selecting and shift mechanism as taken on the line 6—6 of Fig. 3.

Figure 3:
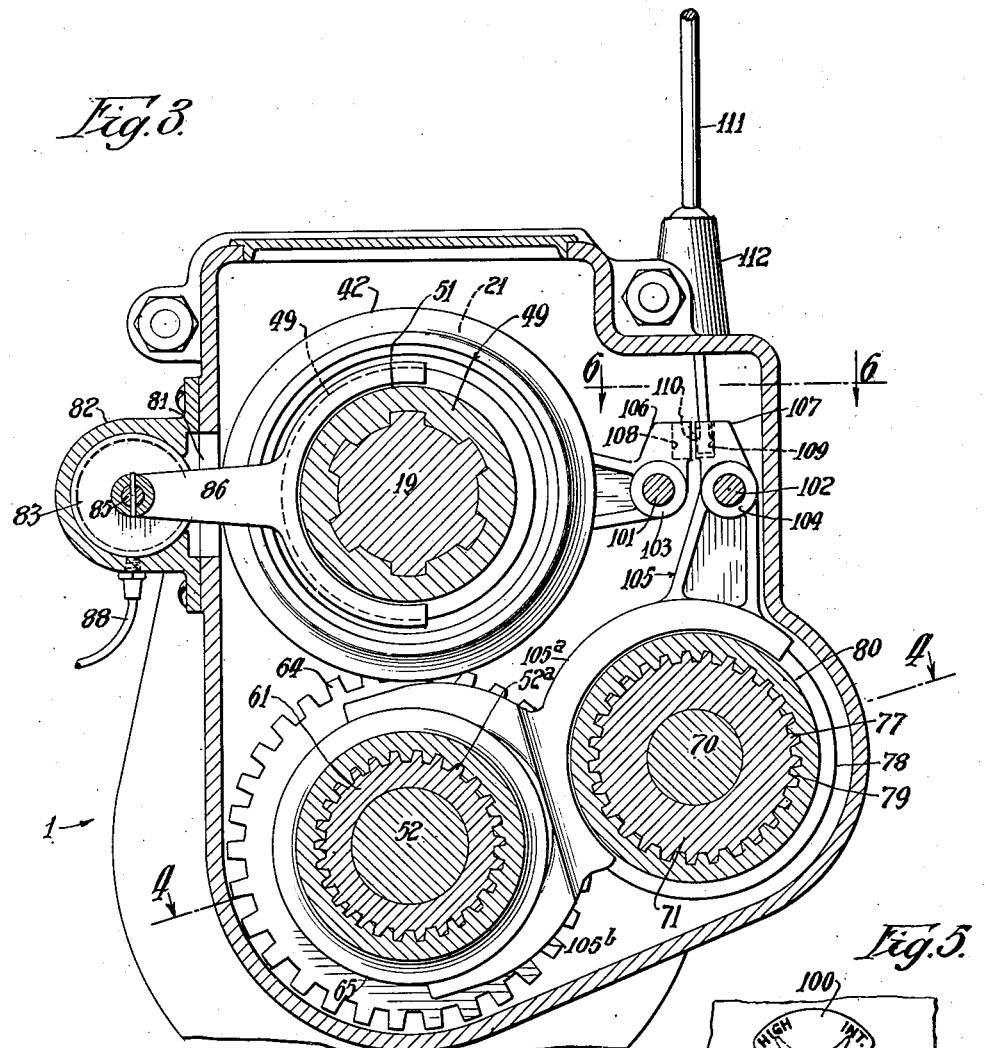
Fig. 3 is a transverse vertical sectional view through the same as taken on the line 3—3 of Fig. 2.

Referring now in detail to that embodiment of the invention illustrated in the drawings:

1 indicates as a whole the casing of the transmission which for assembly purposes is preferably made in front and rear end casing parts 2 and 3 respectively, having a bolted together connection. The front casing part has front and rear walls 4 and 5 respectively, while the rear end casing part is open at the front and is closed at the rear by a wall 6. The front wall 4 of the casing part 2 has a bolted on connection with an associated clutch housing 7, arranged in the conventional manner at the rear end of an engine 8. The inlet and exhaust manifolds of the engine are indicated at 10 and 11 respectively.

12 indicates as a whole, the driving shaft for the transmission which is operatively connected in the usual manner with the clutch mechanism in the casing 7. This shaft is journalled near its rear end in an antifriction bearing 13, supported in the wall 4 of the front end casing part 2. To the rear of said bearing, said shaft is formed to provide a gear 14. The extremity of said gear is made as an annular flange 15 and a radial flange 16, the latter being spaced slightly rearwardly from the gear and being formed with external spline or clutch teeth 17. On the annular flange 15 is provided a tapering friction clutch ring 18. The purpose of said teeth and ring will soon appear.

19 indicates as a whole, the driven shaft of the transmission arranged in axial alignment with the driving shaft 12. The front end of said driven shaft is reduced in diameter and extends into a recess provided in the rear end of the shaft 12 therefor. An antifriction bearing 20 is provided in said recess for the end of reduced diameter of the driven shaft.

Located in the rear end casing part 3 of the transmission is a gear 21 which is rotatively mounted with respect to the driven shaft 19. Antifriction bearings 22 are provided between said gear and shaft. The gear 21 has a front end hub extension, that is externally journalled in an antifriction bearing 23. This bearing is supported in a plate 24 fixed in a shouldered opening provided therefor in the rear end wall of the casing part 2 of the transmission.

24 indicates as a whole the power take-off shaft of the transmission arranged axially in alignment with the driven shaft. Said power take-off shaft is journalled at a point between its ends in an antifriction bearing 25 suitably supported in the rear end wall 6 of the casing part 3. The shaft 24 forwardly of said bearing is formed to provide a gear 26, of a diameter greater than that of the gear 21.

In the front end of the shaft 24, a recess is formed into which the rear end part of reduced diameter of the driven shaft 19 extends. Antifriction bearings 27 are arranged in said recess for said end part of the driven shaft. The rear end of the power take-off shaft extends beyond the wall 6 of the casing part 3 and there has secured to it a coupling flange 28. By means of said flange, the shaft may be operatively connected to an associated propeller shaft, not shown. Secured to the wall 6 and surrounding said rear end part of the power take-off shaft is a housing 29 for enclosing a worm gear 30 fixed with respect to said shaft part. Meshing with said worm gear is a transversely disposed worm 31 which constitutes the drive for an associated speedometer (not shown).

Splined on the driven shaft, slightly to the rear of the gear 14 is a clutch member 32 provided on its periphery with external spline teeth 33 matching the teeth 17 on the flange 16. The front end of said clutch member is internally coned as at 34 for engagement with the associated surface of the friction ring 18. On the rear end of the clutch member 32 a radial shoulder or flange 35 is provided and on the driven shaft 19, to the rear of the clutch member 32, is an annular shoulder 36 which limits the rearward movement of the clutch member on said shaft.

A shift collar 37 is mounted on the clutch member 32 and said collar is internally splined to match up with the splines 33 and 17 respectively. Certain splines of this collar are provided with a V-shaped recess or notch 38 in which is normally engaged, a spring pressed detent in the form of a ball 39, carried by the clutch member. Said spring pressed detent releasably holds the collar in its normal position on the clutch member and from which position it may be shifted forwardly to engage the spline teeth 17. The collar 37 is provided with an annular groove 40 to receive a yoke 41 by which shifting movement may be imparted to said collar.

Assume that the clutch member 32 and collar 37 are in their normal neutral position as shown in full lines in Fig. 2. When the yoke 41 is actuated to shift the collar 37 forwardly out of said normal neutral position, said collar because of the spring pressed detent 39 will cause the clutch member 32 to move therewith until the internally coned surface 34 of said member engages with the friction ring 18. This will synchronize the clutch member and driving shaft after which the restraining action of the detent is overcome and the collar moves forwardly so that its spline teeth engage the like teeth 17. This positively connects the driving shaft 12 and driven shaft 19 together.

When the collar 37 is shifted rearwardly, it is limited on the clutch member by the detents 39 which will snap back into the recesses 38 so that said collar picks up the clutch member 32 and returns it to its normal position on the shaft 19. This breaks the driving connection between said shafts so that they are again relatively rotatable.

The gear 21 is made with an annular rearward extension 42 that overhangs or embraces a clutch collar 43 fixed to the driven shaft 19, against endwise or rotative movement. Said collar has pockets in its periphery to receive rollers 44 so that the gear extension 42, collar 43 and rollers 44 provide an overrunning clutch of a well-known type. While a clutch of the roller type is described, it is apparent that any other type of overrunning clutch may be substituted therefor.

The front end of the power take-off shaft 24 has journalled thereon by means of an antifriction bearing 45, a clutch collar 46. This collar is provided with peripheral pockets, each receiving a roller 47 whereby an overrunning clutch is provided between said collar and the gear portion 26 of said shaft 24. On the front end of the clutch collar 46 are provided, external spline teeth 48, the purpose of which will soon appear.

On the driven shaft 19 between the clutch members 43—46, is splined a shiftable clutch collar 49. This collar 49 is provided at its rear end with internal spline teeth 50 that match up with the teeth 48 on the clutch member 46. Near the front end of said collar 49 is provided an annular groove 51 adapted to receive a shifter yoke whereby said collar may be shifted longitudinally of the shaft 19.

With the collar 49 in the full line position shown in Fig. 2, said collar merely rotates with the driven shaft. When said collar has been shifted rearwardly into the dotted line position shown in said Fig. 2, it engages with collar 46 so that the same rotates therewith. This drives the power take-off shaft 24 through the overrunning clutch that includes the rollers 47. Thus when the collar 49 is in its forward position, the shafts 19 and 24 are disconnected but when said collar 49 is in its rearward position, said shafts are connected together, by the overrunning clutch.

52 indicates the jack shaft arbor of the transmission which is disposed in the plane of but below the driven shaft 19. The front end of this shaft carries a bushing 53 which is journalled in an anti-friction bearing 54 supported in the front wall 4 of the front end casing part 2.

The rear end of said shaft extends through a tubular secondary jack shaft 55 that includes a low speed gear 55a which is in constant mesh with the gear 26 on the power take-off shaft 24. The secondary jack shaft 55 is externally journalled at its rear end by anti-friction bearings 56 supported in the rear end wall 6 of the rear end casing part 3 and is internally journalled at its front end by antifriction bearings 57 supported by the arbor 52. The front end of said secondary jack shaft is provided with external spline teeth 58, best shown in Fig. 2.

Splined on the front end portion of the jack shaft arbor 52, just to the rear of the bushing 53, is a gear 59 and clutch member 60. The gear 59 is in constant mesh with the gear 14 of the driving shaft. Journalled on the jack shaft arbor between the clutch member 60 and the secondary jack shaft 55 is a second tubular jack shaft which constitutes the primary jack shaft 61 of the transmission. Between the ends of said primary jack shaft and the arbor 52 are antifriction bearings 62 and at a point between its ends, where it extends through the rear wall 5 of the rear casing part 2, said primary jack shaft is journalled in antifriction bearings 63 supported in said wall.

Just to the rear of said bearing 63, the primary jack shaft is formed to provide a gear 64 that is in constant mesh with the gear 21 previously mentioned. The rear extremity of said primary jack shaft is provided with external spline teeth 52a that match up with the teeth 58. On said spline teeth 52a is mounted a shift collar 65 that has internal spline teeth 66 and an external annular groove 67 to receive a shifter yoke. When the collar is in the full line forward position, as shown in Fig. 2, the primary jack shaft 61 and the secondary jack shaft 55 are operatively disconnected. When said collar is in the rearward dotted line position, shown in Fig. 2, the collar 65 bridges the spline teeth 58 and 66 and operatively connects the primary and secondary jack shafts together.

The front end of said primary jack shaft is made as an annular flange 68 that overhangs but is radially spaced from the clutch collar 60. This collar has peripheral recesses in which are disposed clutch rollers 69 to provide a one-way clutch between the gear 59 and primary jack shaft 61.

Figure 4:
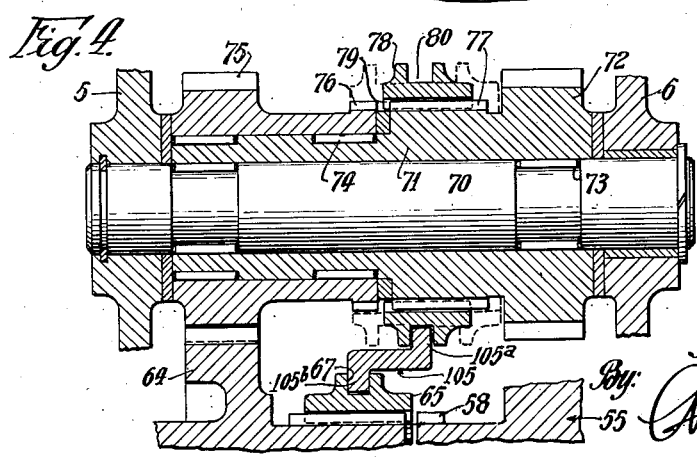
Fig. 4 is a horizontal detail sectional view through the idler shaft of the transmission as taken on the line 4—4 of Fig. 3.

70 indicates an idler shaft arranged to one side of and in a plane between the horizontal planes of the shaft 19 and arbor 52 respectively. Said idler shaft is fixed at its ends in the rear walls 5 and 6 respectively of the casing parts 2 and 3 as best shown in Fig. 4. Rotative on said shaft is an idler sleeve 71, the rear end of which is made as a pinion 72 having a constant mesh with the gear 26 on the driven shaft. Spaced antifriction bearings 73 are provided between said shaft and sleeve.

The front end of said sleeve is reduced in diameter and journalled thereon by means of antifriction bearings 74, is a gear 75. This gear has constant mesh with the gear 64 on the primary jack shaft 61. The rear end of the hub of said gear 75 is provided with external splines 76 that match up with similar spline teeth 77 on the sleeve 71 forward of the pinion 72 thereon. These latter mentioned spline teeth are relatively long and normally engaged thereon is a shift collar 78 having coacting internal spline teeth 79. The collar 78 is provided with an annular groove 80 whereby it may be shifted from its normal full line position shown in Fig. 4 to either dotted line position shown in said Fig. 4. When said collar has been shifted into the dotted line forward position, it connects the gear 75 to said sleeve 71 and pinion 72.

Preferably the collars 78 and 65 are so connected that they shift together as a unit. Thus when the collars 65 and 78 are shifted from the full line neutral position as shown in Figs. 2 and 4, to the dotted line forward position, shown in said figures the gear 75 and pinion 72 are connected together. When said collars are shifted to the dotted line rearward position shown in said Figs. 2 and 4, the gear 72 and pinion 75 are disconnected and the primary and secondary jack shafts are connected together.

The shifts for the several clutch members or collars may be provided in several different ways. Preferably it is desired that the clutch collar 37 and the collars 65 and 78 as a unit be shifted by suitable selecting means, such as a shift lever. It is also preferable that the collar 49 be shifted by some means independent of that just above mentioned and in Figs. 1 and 3 said collar 49 is shifted longitudinally in either direction by mechanism actuated by a vacuous condition produced by the engine 8.

As shown here, said means are as follows:

In that side of the rear end casing part 3 opposite the idler shaft 70 and parts thereon, is an opening 81. Covering said opening is a removable housing 82. In said housing is located a cylinder 83 and slidable in said cylinder is a piston 84. Said piston has a rearwardly extending piston rod 85 fixed thereto and on the rear end of said rod is secured a yoke 86. This yoke extends laterally inward of the casing part 3 to operatively engage in the groove 51 of the clutch member or collar 49.

A conduit 87 opens at its rear end into the front end of the cylinder 83 while a second conduit 88 opens at its rear end into the rear end of said cylinder at its bottom. The other or front end of both conduits 87—88 open into the casing of a control valve 89 mounted on one side of the front end casing part 2. The casing of the control valve 89 is also connected by a conduit 90 with the inlet manifold 10 of the engine 8.

Within the casing of the control valve 89 is a piston valve 91 so formed that when it is moved to one end of the casing, it opens communication between the inlet manifold and one end of the cylinder 83. When the conduit 87 is connected through the control valve 89 with the inlet manifold 10, a vacuous condition is established in the front end of the cylinder 83 so that the piston 84 moves toward said end. When the conduit 88 is connected through the control valve 89 with the inlet manifold 10, a vacuous condition is established in the rear end of the cylinder 83 so that the piston 84 moves toward said end.

In the movement of the piston, the rod 85 moves therewith and as the shifter arm 86 is connected to said rod 85 and the collar 49 respectively, it is apparent that the collar 49 is shifted from the full line position shown in Fig. 2 to the dotted line position shown therein and vice versa.

To actuate the piston of the control valve from a position convenient for the driver, the following means is provided:

91a indicates the instrument board of the automobile and 92 indicates the dash board thereof. Journalled in said boards is a rock shaft 93. The front end of said shaft forward of the dash board, has an arm 94 secured thereto. One end of a Bowden wire 95 is connected to said arm. The other end of said wire extends through the front end of the casing of the control valve 89 and is there secured to the piston valve 91. The wire mentioned is enclosed in a suitable sheath 96.

Figure 5:
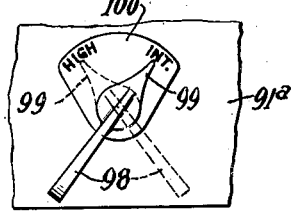
Fig. 5 is a view in front elevation on an enlarged scale of a certain operating lever and associated parts mounted on the instrument board and which will be more fully referred to later.

The rear end of said shaft 93 extends through a suitable bushing 97 in the instrument board 91a and has an operating arm 98 fixed to its extremity beyond the instrument board. This arm includes a pointer 99 that cooperates with a face plate 100 secured to said instrument board. The arm 98 may be swung from one position to the other and which positions correspond to the full line and dotted line positions of the collar 49 as shown in Fig. 2. To guide the driver in selecting the desired position of the collar 49, the face plate 100 is provided with the legends "High" and "Int." as shown in Fig. 5. This latter legend indicates an intermediate speed of the transmission and corresponds to the full line position shown in Fig. 2.

To impart simultaneous shift to the collars 65 and 78, as well as to the collar 37, in the desired sequence, the following arrangement is provided:

In that side of the casing parts 2 and 3 opposite the side in which the cylinder 83 is mounted, we provide two longitudinally extending rods 101 and 102 respectively. The rod 101 is fixed at its ends in said casing part so as to be incapable of endwise movement, while the rod 102 is so mounted at its ends in said casing parts as to be capable of a shifting movement. The rod 101 is associated with the high gear ratio forward, for the transmission and the rod 102 is associated with the low gear ratio forward and reverse for the transmission.

Slidable on the rod 101 is the hub 103 for the shifter yoke 41 associated with the collar 37. Fixed to the rod 102 is a hub 104 and a duplex shifter yoke 105. This last mentioned yoke includes longitudinally offset shifter yoke parts 105a and 105b respectively. The shifter yoke part 105a engages in the groove 80 of the reverse speed providing collar 78 while the shifter yoke part 105b engages in the groove 67 of the first speed forward or low gear ratio providing collar 65. The offset between the yoke parts 105a—105b is best shown in Figs. 3 and 4 respectively.

Each hub 103—104 includes upstanding lugs 106 and 107 respectively and in the opposed faces of said lugs are pockets 108 and 109. These pockets are adapted to receive the selective head 110 on the bottom end of a selector and shift lever 111, said lever having a ball joint engagement in a castle or dome 112 provided therefor on the casing part 2.

The parts just above described, are so arranged that when the transmission is in neutral, the selector head 110 is engaged in the pocket 109 of the shifter yoke hub 104. In this position, as shown in Fig. 6, the pocket 108 in the lug 106 is offset longitudinally from the pocket 109 in the lug 107 so that the head 110 cannot be moved out of the pocket 109 at this time.

To provide first speed forward, the lever 111 is actuated or swung forwardly to shift the rod 102 and the yoke 104 thereon rearwardly. In this movement of the yoke, the collar 78 is shifted rearwardly away from the spline teeth 76 (from which it is normally disengaged) into an inoperative position toward the pinion 72. Furthermore, in this movement of the yoke, the collar 65 is also shifted rearwardly and its teeth 66 engage the teeth 57 of the secondary jack shaft 55 and connects the same to the sleeve 61. Thus the drive is from the shaft 12 through gears 14 and 59 and through the parts 60—69 and 68 forming the overrunning clutch before mentioned, to the primary jack shaft 61. As the primary and secondary jack shafts are now connected together by the collar 65, the gear 26 becomes driven and likewise the power take-off shaft 24, of which said gear forms an integral part.

To provide the high speed or gear ratio forward, the lever 111 is actuated or swung laterally to first drop the hub 104 and pick up the yoke hub 103. When said lever is then swung rearwardly, this will shift the hub 103 and its yoke 41 forwardly. In the initial part of the shift of the hub 103, the clutch member 32 is shifted forwardly therewith because of the spring pressed detent 38. In this shift of the clutch member 32, this brings the surface 34 thereof into frictional engagement with the clutch ring 18 so that the clutch member is synchronized with the gear 14. In the final part of the shift of the yoke hub 103, the spring detent 39 is depressed and the collar 37 is shifted over to engage the spline teeth 16 of the gear 14. This positively connects the driving shaft and clutch member together through the collar 37.

The drive is then from the shaft 12 through collar 37 to the clutch element 32 to the driven shaft 19. From this shaft power is transmitted through the ring 43 and clutch rollers 44 to the clutch member 42 of which the gear 21 forms a part. As the gear 21 is in constant mesh with the gear 64, this will drive the primary jack shaft 61 at a differential with respect to the gear 59. This differential, however, is permitted because of the one-way clutch as provided by the ring 60, rollers 69 and clutch member 68. From the primary jack shaft, the drive follows through the collar 65 to the secondary jack shaft 55 to the gear 26. Thus the shaft 24 is driven in forward but at a higher ratio than before but not at a one-to-one ratio with respect to the shaft 12.

To provide a still higher or one-to-one ratio between the shafts 12 and 24, the lever 111 is left undisturbed. The operator then swings the member 98 on the instrument board 91a counterclockwise and this imparts a push on the Bowden wire 95 to move the valve plug 91 rearwardly in the valve casing 89. This connects the conduit 88 with the conduit 90 and establishes a vacuous condition in the rear end of the cylinder 83. The piston 84 therein then moves rearwardly and as the yoke 86 is connected to the piston rod 85, said yoke 86 moves rearwardly.

As the yoke 86 is engaged in the groove 51 of the clutch collar 49 which is splined to the driven shaft 19, said collar is shifted rearwardly into the dotted line position shown in Fig. 2. In this position, the drive is from the shaft 12 through the collar 37 and clutch member 32 to the driven shaft and from said shaft to the clutch collar 49 splined thereon. When said last mentioned clutch collar has been shifted rearwardly into the dotted line position above mentioned, its spline teeth 50 engage the like teeth 48 on the collar 46. Thus the drive is continued through the collar 49 to the collar 46 and roller 47 to the gear 26 and then to the shaft 24. The drive thus provided is a direct or one-to-one ratio through the overrunning clutch. If the shaft 24 should now tend to run faster than the shaft 19, as may occur under momentum when descending a grade, the shaft 24 will overrun the shaft 19 with a free wheeling action.

It is pointed out that in said one-to-one ratio drive, with the gear 26 in constant mesh with the gear 55a on the secondary jack shaft, this will drive the same at a speed different from that at which the primary jack shaft is driven. However, as the secondary jack shaft 55, is at this time connected with the primary jack shaft, through the collar 65, said two jack shafts will rotate together. In this rotation of said jack shafts, the differential in rotation with respect to the gear 59 and arbor 52 is accommodated by the rollers 69 between the flange 68 and collar 60.

To go into reverse drive or speed, the lever 111 is actuated or swung forward to shift the collar 37 out of its splined connection with the spline teeth 17 of the gear 14 and when the notch 38 lines up with the spring pressed detent 39, this again connects the collar and clutch member 32 together. Thereafter the clutch member 32 and collar 37 as a unit are moved rearwardly toward the shoulder 36. This disengages the surfaces 34 and 18 so that the shafts 12 and 19 are disconnected.

The lever is then actuated to drop the yoke hub 103 and pick up the hub 104 and then said lever is actuated to shift the rod 102 forwardly. As the yoke 105 is thus moved forwardly, the collars 65 and 78 are both moved forwardly into the dotted line positions shown in Figs. 2 and 4. In said forward movement the collar 65 moves into a position adjacent the gear 64 and the collar 78 moves into a position where its teeth 79 engage the teeth 76 on the gear 75 and thus connects said gear and the pinion 72 positively together.

The drive is then from the shaft 12 and gear 14 to gear 59 and through the overrunning clutch parts 60, 69 and 68 to the primary jack shaft 61. The gear 64 thereon, being in constant mesh with the gear 75 on the idler shaft, will drive said gear 75 and this through the collar 78 will drive the pinion 72. As said pinion is in constant mesh with the gear 26, this will drive said gear and its associated power takeoff shaft 24 in a direction opposite that of the shaft 12. As the gear 55a on the secondary jack shaft 55 is in constant mesh with the gear 26, it is apparent that said shaft 55 will be driven in a direction opposite to that of the primary jack shaft 61. However, at this time the secondary jack shaft is disconnected from the primary jack shaft so that it merely rotates idly on the arbor 52.

To go into neutral, the lever 111 is actuated to shift the yoke 104 into the full line position shown in Fig. 6. At this time, the collar 78 has been released from the teeth 76 of the gear 75 so that said gear and the pinion 72 are relatively rotatable. Furthermore, at this time the collar 65 is out of engagement with the spline teeth 57 on the secondary jack shaft 55 and therefore, there is no driving connection between the primary and secondary jack shafts.

With the parts in neutral and with the shaft 12 acting as the driver, only the primary countershaft 61 and the reverse gear 75 are being idly driven.

It is further pointed out at this time that to provide reverse, it is not necessary that the lever 98 be manipulated to actuate the valve 89 so as to cause the piston 84 to shift the collar 49 out of engagement with the ring 46 of the associated clutch. It is preferable however, that such a change be made from direct high to the indirect high so that when going out of reverse into first speed forward, the parts are in position for moving into indirect high speed forward previous to again going into direct high speed forward.

It is apparent that the improved transmission is capable of providing a reverse speed and low speed forward, an indirect and higher speed forward and then a direct and still higher speed ratio forward and in both of said high speed ratios forward, free wheel is possible.

While in describing the invention, we have referred in detail to the form, arrangement and construction of the various parts of the transmission, the same is to be considered only in its illustrative sense so that we do not wish to be limited thereto, except as may be specifically set forth in the appended claims.

We claim as our invention:

1. In an automotive transmission, the combination of a driving shaft, an arbor, means for driving the arbor, primary and secondary jack shafts journalled on said arbor, a power take-off shaft, means including an overrunning clutch for driving the primary jack shaft from said arbor, operable means for coupling the primary and secondary jack shafts together, and means for driving the power take-off shaft from the secondary jack shaft.

2. In an automotive transmission, the combination of a driving shaft, an arbor, primary and secondary jack shafts journalled on said arbor, a power take-off shaft, gears on the driving shaft and arbor respectively, an overrunning clutch between said primary jack shaft and said arbor, operable means for coupling the primary and secondary jack shafts together, and means for driving the power take-off shaft from the secondary jack shaft.

3. In an automotive transmission, the combination of a driving shaft, an arbor, primary and secondary jack shafts journalled on said arbor, a power take-off shaft, constant mesh gearing between said driving shaft and arbor, an overrunning clutch between said arbor and primary jack shaft, operable means for coupling said primary and secondary jack shafts together, and means for driving the power take-off shaft from the secondary jack shaft.

4. In an automotive transmission, the combination of a driving shaft, a rotatively journalled jack shaft arbor, primary and secondary jack shafts rotatively mounted on said arbor, a power take-off shaft, means for driving said arbor from the driving shaft, an overrunning clutch between said arbor and primary jack shaft, a shiftable clutch collar for coupling said primary and secondary jack shafts together, and means for driving the power take-off shaft from the secondary jack shaft.

5. In an automotive transmission, the combination of a driving shaft, a rotatively journalled jack shaft arbor, primary and secondary jack shafts rotatively mounted on said arbor, a power take-off shaft, means for driving said arbor from the driving shaft, an overrunning clutch between said arbor and primary jack shaft, external spline teeth on the adjacent ends of said primary and secondary jack shafts, a collar mounted on one of said jack shafts and having internal spline teeth and shiftable to engage its spline teeth with those on the other jack shaft to connect said primary and secondary jack shafts together, and means for driving the power take-off shaft from the secondary jack shaft.

6. In an automotive transmission, the combination of a driving shaft, a rotatively journalled jack shaft arbor, primary and secondary jack shafts rotatively mounted on said arbor, constant mesh gearing between said driving shaft and arbor, an overrunning clutch between said arbor and said primary jack shaft, operable means for coupling said primary and secondary jack shafts together, and means for driving the power take-off shaft from the secondary jack shaft.

7. In an automotive transmission, the combination of a driving shaft, a rotatively journalled jack shaft arbor, primary and secondary jack shafts rotatively mounted on said arbor, constant mesh gearing between said driving shaft and arbor, an overrunning clutch between said arbor and said primary jack shaft, operable means for coupling said primary and secondary jack shafts together, and constant mesh gearing between said secondary jack shaft and said power take-off shaft.

8. In an automotive transmission, the combination of a driving shaft, an arbor constantly driven thereby, a driven shaft, primary and secondary jack shafts journalled on the arbor, a power take-off shaft, means operable to drive the driven shaft from the driving shaft, means including an overrunning clutch for driving the primary jack shaft from the driven shaft, operable means for coupling the primary and secondary jack shafts together, and means for driving the power take-off shaft from the secondary jack shaft.

9. In an automotive transmission, the combination of a driving shaft, an arbor driven thereby, a driven shaft, primary and secondary jack shafts journalled on said arbor, a power take-off shaft, means operable to drive the driven shaft from the driving shaft, power transmitting members on said driven and primary jack shafts respectively, an overrunning clutch between one of said members and its associated shaft, operable means for coupling said primary and secondary jack shafts together, a second overrunning clutch between said arbor and jack shaft, and means for driving the power take-off shaft from the secondary jack shaft.

10. In an automotive transmission, the combination of a driving shaft, an arbor driven thereby, a driven shaft, primary and secondary jack shafts journalled on the arbor, a power take-off shaft, operable means for connecting the driving and driven shafts together, a gear loose on the driven shaft, an overrunning clutch between said gear and driven shaft, a gear on the primary jack shaft in constant mesh with the gear loose on the driven shaft, a second overrunning clutch between the arbor and primary jack shaft, operable means for coupling the primary and secondary jack shafts together, and means for driving the power take-off shaft from the secondary jack shaft.

11. In an automotive transmission, the combination of a driving shaft, an arbor driven thereby, a driven shaft, primary and secondary jack shafts journalled on the arbor, a power take-off shaft, a shiftable clutch for operatively connecting the driving and driven shafts, an overrunning clutch on the driven shaft, a gear for driving the primary jack shaft from the overrunning clutch, operable means for coupling the primary and secondary jack shafts together, and means for driving the power take-off shaft from the secondary jack shaft.

12. In an automotive transmission, the combination of a driving shaft, an arbor driven thereby, a driven shaft, primary and secondary jack shafts journalled on the arbor, a power take-off shaft, a shiftable clutch for operatively connecting the driving and driven shafts, constant mesh gears on said driven shaft and primary jack shaft respectively, an overrunning clutch between one of said gears and its associated shaft, a second overrunning clutch between said arbor and said primary jack shaft, operable means for coupling said primary and secondary jack shafts together, and constant mesh gears between said power take-off shaft and said secondary jack shaft.

13. In an automotive transmission, the combination of a driving shaft, an arbor, a driven shaft, a primary and a secondary jack shaft journalled on the arbor, a power take-off shaft, means operable to drive the driven shaft from the driving shaft, means providing a driving connection between the driving shaft and arbor and an overrunning clutch between said arbor and primary jack shaft, means on said driven shaft and primary jack shaft providing a driving connection therebetween, operable means for connecting the primary and secondary jack shafts together, and means for driving the power take-off shaft from the secondary jack shaft.

14. In an automotive transmission, the combination of a driving shaft, an arbor, a driven shaft, primary and secondary jack shafts journalled on the arbor, a power take-off shaft, operable means for connecting said driving and driven shafts together, constant mesh gearing between said driving shaft, and arbor for driving the latter, an overrunning clutch between the arbor and primary jack shaft, constant mesh gearing including an overruning clutch between said driven shaft and primary jack shafts, operable means for coupling the primary and second jack shafts together, and constant mesh gearing between the secondary jack shaft and the power take-off shaft.

15. In an automotive transmission, a driving shaft, a driven shaft, a rotatively mounted jack shaft arbor, primary and secondary jack shafts journalled on said arbor, a power take-off shaft, operable means for connecting said driving and driven shafts together, constant mesh gears between the driving shaft and arbor, an overruning clutch between the gear on said arbor and said primary jack shaft, a gear loose on the driven shaft and meshing with a gear fixed on the primary jack shaft, an overrunning clutch between the driven shaft and the gear loose thereon, operable means for coupling the primary and secondary jack shafts together, and constant mesh gearing on the power take-off shaft and the secondary jack shaft.

16. In an automotive transmission, a driving shaft, a power take-off shaft, primary and secondary jack shafts, an idler shaft, means for driving the primary jack shaft from the driving shaft, means for driving the power take-off shaft from the idler shaft, operable means for connecting or disconnecting the primary and secondary jack shafts, and means operable in moving said last mentioned means into a position disconnecting said primary and secondary jack shafts for driving the power take-off shaft from the primary jack shaft through the idler shaft in the direction of the primary jack shaft.

17. In an automotive transmission, a driving shaft, a power take-off shaft, primary and secondary jack shafts, an idler shaft, means for driving the primary jack shaft from the driving shaft, means for driving the power take-off shaft from the secondary jack shaft, a clutch associated with said primary and secondary jack shafts for operatively connecting or disconnecting said shafts, means for shifting said clutch, gearing on said idler shaft and meshing with gearing on one of said jack shafts and on the power take-off shaft respectively, and means associated with said shifting means and operating on the gearing on the idler shaft to connect said power take-off shaft to the primary jack shaft when said shifting means has been moved into a position disconnecting said primary and secondary jack shafts.

18. In an automotive transmission, a driving shaft, a power take-off shaft, primary and secondary jack shafts, an idler shaft, means for driving the primary jack shaft from the driving shaft, means for driving the power take-off shaft from the secondary jack shaft, a gear on said primary jack shaft, a gear on the power take-off shaft, a clutch shiftable to connect or disconnect said primary and secondary jack shafts, gears loose on said idler shaft and meshing with the gears on said primary jack shaft and said power take-off shaft respectively, a clutch shiftable with respect to the idler shaft to connect or disconnect said gears thereon, and means common to both of said clutches for shifting them together in unison to disconnect the gears on the jack shaft and to connect the gears on the idler shaft together so that the power take-off shaft is driven from and in the direction of the primary jack shaft.

19. In an automotive transmission, a driving shaft, a power take-off shaft, primary and secondary jack shafts, an idler shaft, constant mesh gearing for driving the primary jack shaft from the driving shaft, constant mesh gearing for driving the power take-off shaft from the secondary jack shaft, coacting clutch teeth on adjacent ends of the primary and secondary jack shafts, a shiftable collar having clutch teeth adapted when said collar is in one position to bridge the teeth on the primary and secondary jack shafts to connect them together, an idler shaft, gears loose thereon and constantly meshing with those on the primary jack shaft and power take-off shaft respectively, clutch teeth on said gears loose on the idler shaft, a shiftable collar associated with said gears on the idler shaft and having teeth adapted when said collar is in a position to bridge the clutch teeth of the gears loose thereon for connecting them together, and shifting means common to both collars so that when the collar associated with the primary and secondary jack shafts is in a position connecting said shafts together, the collar associated with the gears loose on the idler shaft is in a position disconnecting said gears thereon, and when said collar on the primary and secondary jack shafts is in a position disconnecting them, the collar on the idler shaft is in a position connecting the gears thereon together so that the power take-off shaft is being driven by and in the direction of the primary jack shaft.

20. In an automotive transmission, a driving shaft, a driven shaft, a power take-off shaft, a gear thereon, primary and secondary jack shafts, an idler shaft, means including an overrunning clutch for driving the primary jack shaft from the driving shaft, operable means for connecting the driving and driven shafts, means for driving gear on the power take-off shaft from the secondary jack shaft, means for driving the primary jack shaft from the driven shaft, operable means for connecting or disconnecting said primary and secondary jack shafts, and gearing on the idler shaft driven from one of the jack shafts and meshing with the gear on the power take-off shaft for driving the latter from the idler shaft when said operable means is in a position disconnecting said primary and secondary jack shafts.

21. In an automotive transmission, a driving shaft, a driven shaft, a power take-off shaft, primary and secondary jack shafts, an idler shaft, means including an overrunning clutch for driving the primary jack shaft from the driving shaft, operable means for connecting the driving and driven shafts, means for driving the power take-off shaft from the secondary jack shaft, an overrunning clutch associated with the power take-off shaft and including a gear, means for connecting a part of said clutch to said driven shaft, operable means for connecting and disconnecting said primary and secondary jack shafts, and gearing on the idler shaft driven from one of the jack shafts and meshing with the gear included in the overrunning clutch associated with the power take-off shaft for driving the power take-off shaft from the idler shaft when said operable means is in a position disconnecting said primary and secondary jack shafts.

22. In an automotive transmission, a driving shaft, a driven shaft, a power take-off shaft, primary and secondary jack shafts, an idler shaft, constant mesh gearing between the driving shaft and primary countershaft and including an overrunning clutch, shiftable means for connecting and disconnecting the driving and driven shafts, constant mesh gears on the driven and primary jack shafts, constant mesh gears on the power take-off and secondary jack shaft, gears loose on the idler shaft and meshing with the gears on the primary jack shaft and on the power take-off shaft respectively, shiftable means operating when shifted in one direction to connect the primary and secondary jack shafts together and to disconnect the gears on the idler shaft, said last mentioned means when shifted in the other direction operating to connect said gears on the idler shaft and to disconnect the primary and secondary jack shafts, a one-way clutch between the driven shaft and the gear thereon, means providing a normally inoperative one-way clutch associated with the power take-off shaft, and means for connecting said last mentioned one-way clutch to the driven shaft.

23. In an automotive transmission, a driving shaft, a driven shaft, a power take-off shaft, primary and secondary jack shafts, an idler shaft, constant mesh gearing between the driving shaft and primary jack shaft and including an overrunning clutch, shiftable means for connecting and disconnecting the driving and driven shafts, constant mesh gears on the driven and primary jack shafts, constant mesh gears on the power take-off shaft and secondary jack shaft, gears loose on the idler shaft and meshing with the gear on the primary jack shaft and on the power take-off shaft respectively, shiftable means operating when shifted in one direction to connect the primary and secondary jack shafts together and to disconnect the gears on the idler shaft, said last mentioned means when shifted in the other direction operating to connect said gears on the idler shafts and to disconnect the primary and secondary jack shafts, a one-way clutch between the driven shaft and the gear thereon, means providing a normally inoperative one-way clutch associated with the power take-off shaft and a collar splined on the driven shaft and shiftable to engage a part of said last mentioned clutch to connect said power take-off shaft to said driven shaft.

24. In an automotive transmission, a driven shaft, a power take-off shaft, primary and secondary jack shafts, means for driving the power take-off shaft from the secondary jack shaft in the direction of but at a speed less than that of the driven shaft, means including an overrunning clutch for driving the primary jack shaft from the driven shaft, operable means for connecting or disconnecting said jack shafts, a normally inoperative overrunning clutch associated with the power take-off shaft, and means for operatively connecting a part of said last mentioned clutch to said driven shaft so as to drive the power take-off shaft in the same direction and at the same speed as said driven shaft.

25. In an automotive transmission, a driving shaft, a power take-off shaft, means including gearing for driving the power take-off shaft from the driving shaft in a plurality of forward speeds and reverse, shiftable means capable when actuated to provide a reverse or a plurality of different speed ratios forward for the power take-off shaft, means normally engaged with a part of said shiftable means and only engageable with the other part thereof when the first part is in a position providing first speed forward.

26. In an automotive transmission, a driving shaft and a power take-off shaft, means including gearing for driving the power take-off shaft from the driving shaft in a plurality of forward speeds and reverse, a shiftable means associated with a reverse speed and low speed forward, a second shiftable means associated with a higher speed forward, and means for selecting the desired speed ratio, said last mentioned means being capable of being moved to select high speed forward only when said means is in a position corresponding to low speed forward.

HERBERT C. SNOW.
ARTHUR A. STONE.